Aug. 15, 1967   P. E. OBERG ET AL   3,336,154

TESTING APPARATUS AND METHOD

Filed Dec. 20, 1963   6 Sheets-Sheet 1

INVENTORS
PAUL E. OBERG
SIDNEY M. RUBENS
CHARLES H. TOLMAN

BY Thomas J Nikolai
ATTORNEY

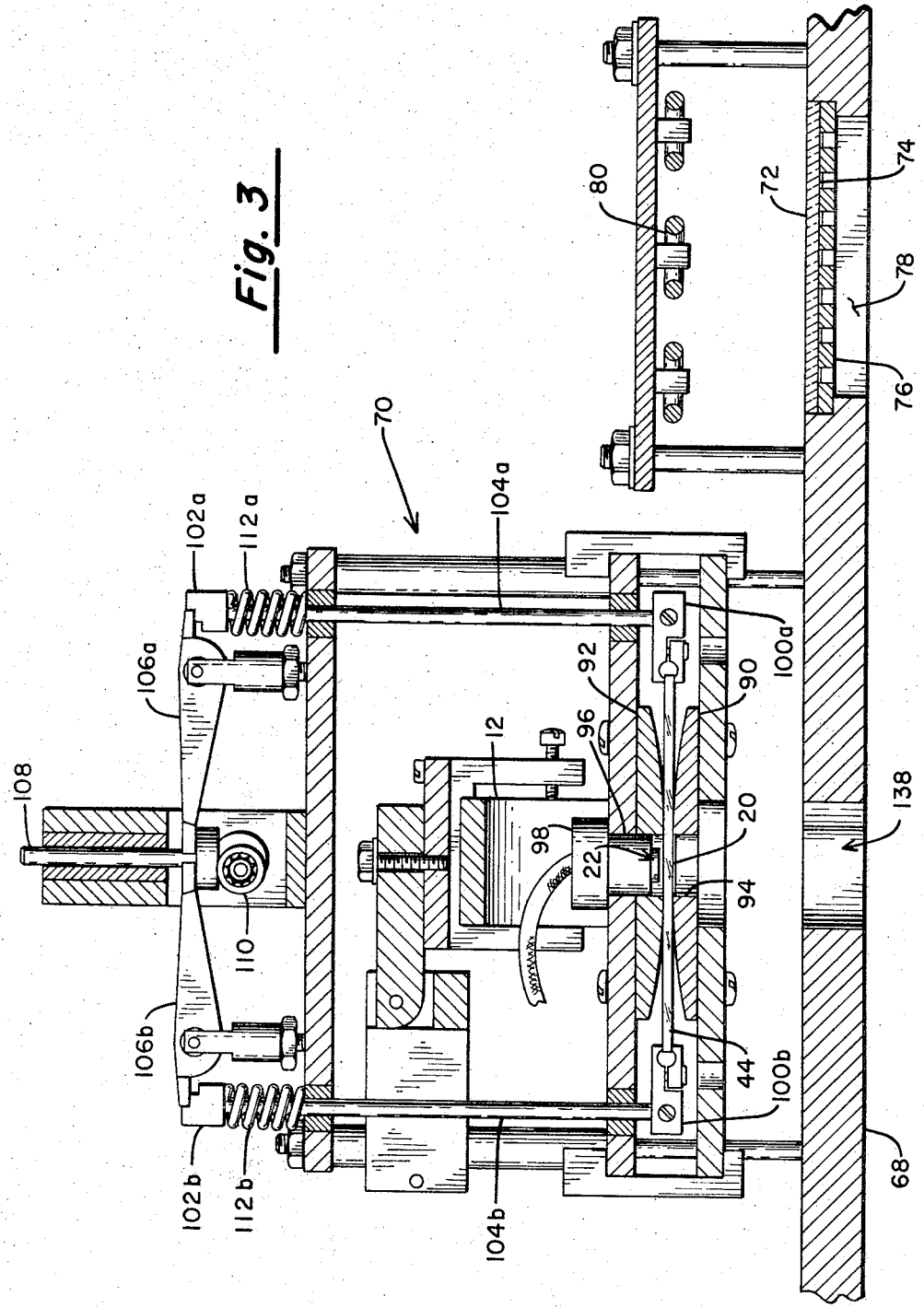

PRIMARILY ROTATIONAL SW.

3,336,154
TESTING APPARATUS AND METHOD
Paul E. Oberg, Minneapolis, Sidney M. Rubens, St. Paul, and Charles H. Tolman, Bloomington, Minn., assignors to Sperry Rand Corporation, New York, N.Y., a corporation of Delaware
Filed Dec. 20, 1963, Ser. No. 332,220
23 Claims. (Cl. 117—93.2)

ABSTRACT OF THE DISCLOSURE

A device for and method of monitoring the varying magnetostrictive characteristics of a deposited-layer element during the generation thereof by applying cyclical stresses thereto and detecting the resultant varying switching field thereof.

---

A material, which when subjected to a magnetic field undergoes a change in its dimensional characteristics, or which when subjected to a stress undergoes a change in its magnetic characteristics is said to be "magnetoelastic." These magnetoelastic effects are known as "magnetostriction." There are two general classes of magnetostrictive materials—those that have positive and those that have negative magnetostriction when subjected to a unidirectional stress. With an element composed of a material having positive magnetostriction the element's magnetization M is increased by an applied tensile stress (or decreased by an applied compressive stress) and its dimensions increase with an applied magnetic field while, correlatively, with an element composed of a material having negative magnetostriction the element's magnetization M is decreased by an applied tensile stress (or increased by an applied compressive stress) and its dimensions decrease with an applied field. The fractional change $\lambda$ in the element's dimension, as for example its length, $l$, $$\lambda = \frac{\Delta l}{l}$$

due to magnetostriction varies with the intensity of the applied magnetic field or stress. For iron, $\lambda$ is positive and increases with an applied field intensity to about H=200 oe. (oersteds); for higher fields iron has a negative value of $\lambda$. For pure polycrystalline nickel and cobalt, $\lambda$ is negative for all applied field intensities H≠0. When nickel (Ni) and iron (Fe) are alloyed, positive magnetostriction results for alloys of material compositions containing approximately 19% or more iron (iron-rich), or negative magnetostriction results for alloys of material composition containing approximately 18% or less iron (nickel-rich). The alloy containing 81% Ni–19% Fe, called 81 Permalloy, is nearly nonmagnetostrictive. A nonmagnetostrictive alloy of cobalt (Co) and iron (Fe) results from a material composition of approximately 96.5% Co–3.5% Fe. Also, magnetostriction generally varies with temperature.

The magnetostrictive characteristics of a deposited-layer element may dictate its usefullness or limitations in a particular application. As an example, a strain gauge may utilize this characteristic for the measuring of applied stresses; the to-be-determined stress produces a known signal output-stress input relationship. In this application as a strain gauge, magnetostriction is a desirable characteristic enabling the determination of unknown applied stresses. However, in other uses as for an example, in magnetizable memory elements of the thin ferromagnetic film type it is desirable that such elements be substantially nonmagnetostrictive. This is so since it is desirable to prevent the stresses that are applied to the film bearing substrate by mechanical or thermal means from adversely affecting the magnetic properties of the film. For this reason most of the research on such films has been confined to the 81.5% Ni–18.5% Fe alloy material discussed above.

The application of a unidirectional stress will alter the value of the film's anisotropy field $H_k$ in films having magnetostriction, $\lambda \neq 0$, and this effect provides a convenient method of measuring the magnetostriction in such films. Prior art methods permit the generation of deposited-layer films in an evacuatable environment having a predictable $\eta$ of $0.0 \pm 0.50 \times 10^4$ oe. The symbol $\eta$ may be defined as the magnetostrictive coefficient of such a film and is defined below where, $H_k'$=effective anisotropy field,
$H_k$=field induced anisotropy field with no stress applied,
$l$=length,
$\Delta l$=change in length, and
$\eta$=magnetostrictive coefficient of anisotropy.

For small changes in composition from that where $\eta=0$;

$$H_k' = H_k + \eta \frac{\Delta l}{l} \tag{1}$$

$$H_k' - H_k = \eta \frac{\Delta l}{l} \tag{2}$$

let:

$$H_k' - H_k = \Delta H_k$$

$$\Delta H_k = \eta \frac{\Delta l}{l} \tag{3}$$

$$\eta = \frac{\Delta H_k}{\frac{\Delta l}{l}} \tag{4}$$

This predictable tolerance of $\pm 0.50 \times 10^4$ oe. is not satisfactory in many applications.

In a thin ferromagnetic film used as a memory element in digital data processing equipment, such a predictable tolerance of $\pm 0.50 \times 10^4$ oe. is not acceptable for high quantity production of thin ferromagnetic films. The present invention provides a means whereby, in production runs, it is possible to monitor the magnetostrictive characteristics of a deposited-layer element during the deposition thereof so as to provide an improved quality control for producing thin ferromagnetic films having a magnetostriction coefficient tolerance of $$\eta = 0.0 \pm .10 \times 10^4 \text{ oe.} \tag{5}$$

As a thin ferromagnetic film of 81.5% Ni–18.5% Fe yields a magnetostriction coefficient $\eta=0$, and a deviation of $$\Delta \eta = \pm 1.0 \times 10^4 \text{ oe.} \tag{6}$$

is equal to approximately a 1% deviation of material composition from the desired 81.5% Ni–18.5% Fe alloy, applicants' methods reduced tolerance of $$\pm 0.10 \times 10^4 \text{ oe.} \tag{7}$$

as compared to the prior art tolerance of $$\pm 0.50 \times 10^4 \text{ oe.} \tag{8}$$

provides a finished product having a deviation from the desired material composition of $$\frac{0.10 \times 10^4}{1.00 \times 10^4} \times 1\% = 0.10\% \tag{9}$$

as compared to the prior art method which provides a $$\frac{0.50 \times 10^4}{1.00 \times 10^4} \times 1\% = 0.50\% \tag{10}$$

deviation from the desired material composition.

Thin ferromagnetic films, such as those fabricated in accordance with Rubens Patent No. 2,900,282, and as utilized in memory systems as shown in Rubens et al.

Patent No. 3,030,612, provide the necessary readout properties for the high-speed, random-access memories needed by present day electronic data processing systems. Such film elements are most practical and operate rapidly with small losses when their magnetostriction is negligible and preferably equal to zero, $\eta=0$. In the fabrication of deposited alloy film elements (such as the 81–19 nickel-iron alloy), large quantity production facilities generally provide lower than desirable percentages of useful yields. A bistable memory element that may be produced by and utilized with the above referenced Rubens patents may consist of a thin vacuum deposited film of 81–19 nickel-iron alloy of approximately 15 mils in diameter and approximately 100 A. to 3000 A. (angstroms) thick, having rectangular hysteresis characteristics and the magnetic characteristic of uniaxial anisotropy providing a preferred, or easy, axis of remanent magnetization. It is known that the magnetic properties of such thin ferromagnetic films are the function of many variables including the intensity and angle of the orienting magnetic field during deposition, the rate of melt evaporation and material composition. The Permalloy slug that is melted and evaporated through a mask onto the substrate as disclosed in the aforementioned Rubens Patent No. 2,900,282 has a Ni-Fe (nickel-iron) composition of approximately 83% Ni and 17% Fe. As the average material composition of the film depends on the temperature of the melt during deposition, and as the rate of evaporation of the melt increases approximately one order of magnitude for each 100 degrees C. (centigrade) increase in the melt temperature during evaporation, the material composition is a sensitive function of melt temperature. As the rates of evaporation for Ni-Fe do not have a corresponding variation with a change in the melt temperature, i.e., a higher melt temperature will cause a greater concentration of Ni to be deposited while a lower melt temperature will cause a greater concentration of Fe to be deposited (ignoring material depletion), by determining the rate of evaporation, i.e., by varying the heat source power input, a Permalloy film possessing the desired Ni-Fe composition (in this case approximately 81.5% Ni–18.5% Fe) can be deposited on a substrate. The pattern of deposited-layer elements, or cores, on a substrate is, as before, determined by the shape of the mask. The thickness of the cores (the test core and the production run films) is controlled by the length of time the controlling shutters are open, and the material composition of the cores is controlled by the melt temperature, the material composition of the melt and the duration, or time, of deposition or generation thereof.

The article entitled, "Measurement of the Easy-Axis and $H_k$ Probabiilty Density Functions for Thin Ferromagnetic Films Using the Longitudinal Permeability Hysteresis Loop," E. J. Torok, R. A. White, A. J. Hunt, and H. N. Oredson, Journal of Applied Physics, volume 33, Number 10, pp. 3037–3041, October 1962, discloses a prior art method of the control of the fabrication of thin ferromagnetic films that utilizes the characteristic of magnetostriction to provide a method of nondestructively determining the magnetic characteristics and material composition of such thin ferromagnetic films after they have been deposited. This method is one that tests the completed films for their conformity to predetermined standards and which provides a means of modifying the deposition process to achieve, on the next production run, a film having the corrected characteristics. However, there is provided no means of monitoring the magnetic characteristics of the film during its generation and of adjusting the generating parameters, such as temperature, material composition, rate of deposition, etc., accordingly so as to ensure a final product having the desired magnetic characteristics. The present invention is directed towards such a method.

The present invention, in the preferred embodiment, utilizes a specially developed test apparatus that is placed in the environment in which the deposited-layer elements are to be generated. The vaporized material is deposited on a test substrate member held in the test apparatus in the same manner as it is deposited on the production substrates. A test-film, of the same material as the production run elements, having a substantial width and length—in the preferred embodiment of the apparatus of FIG. 1 the aperture in the mask used produced a test-film of approximately 0.6 x 0.6 inch—is deposited on the test substrate member which is clamped between two opposing, convex-surfaced, supporting members. The test substrate member is held on its opposite ends by a pair of clamps that are driven by a cam, cam-follower and rocker-arm arrangement, which arrangement cyclically flexes the test substrate member as it alternately pulls up on and pushes down on the test substrate member ends. This flexing of the test substrate member induces alternate tensile and compressive stresses into the test-film while it is being deposited on the bottom surface of the test substrate member. Besides the DC orienting field of approximately 45 oersteds, which may be utilized for the orienting of the material to produce the required uniaxial anisotropy in the production run elements, an AC field of approximately 55 oe. is, in the embodiment of FIG. 1, applied to the test-film parallel and anti-parallel to the DC orienting field so as to apply a drive field to the test-film. The direction of the test-film's magnetization M is affected by the drive field thereby generating a switching field that is detected by a pickup coil mounted in a superposed relationship above the test-film, and there is generated in the pickup coil a test signal indicative of the switching field's characteristics. The test signal trace may be suitably amplified and displayed upon a monitor oscilloscope and visually observed and analyzed by an operator who may control the generation of the production run elements so as to achieve a finished product having zero magnetostriction. Alternatively, the test signal may be coupled to a signal analyzer that in the case of the preferred embodiment utilizing a ring-wire source would control the electrical power thereto.

Accordingly, it is a primary object of this invention to provide a method and an apparatus for the monitoring of the varying magnetic characteristics of a magnetizable film element, which varying characteristics are a function of its magnetostrictions, during its generation.

It is a further object of this invention to provide a method and an apparatus for the generation of magnetizable film elements having substantially zero magnetostriction.

It is a more general object of this invention to provide a method and an apparatus for the monitoring of the magnetostriction of a deposited-layer element so as to permit a concurrent alteration of the composition of the constituent material so as to achieve an element having a desired magnetostriction.

These and other more detailed and specific objects will be disclosed in the course of the following specification, reference being had to the accompanying drawings in which:

FIG. 3 is a cross-sectional view of the apparatus of FIG. 2 showing the strain inducing apparatus in detail.

FIG. 7b, 7c and 7d are illustrations of the output signal waveforms of the arrangement of FIG. 7a.

FIG. 8b, 8c and 8d are illustrations of the output signal waveforms of the arrangement of FIG. 8a.

FIG. 9b and 9c are illustrations of the output signal waveforms of the arrangement of FIG. 9a.

THEORY

Figure 1:
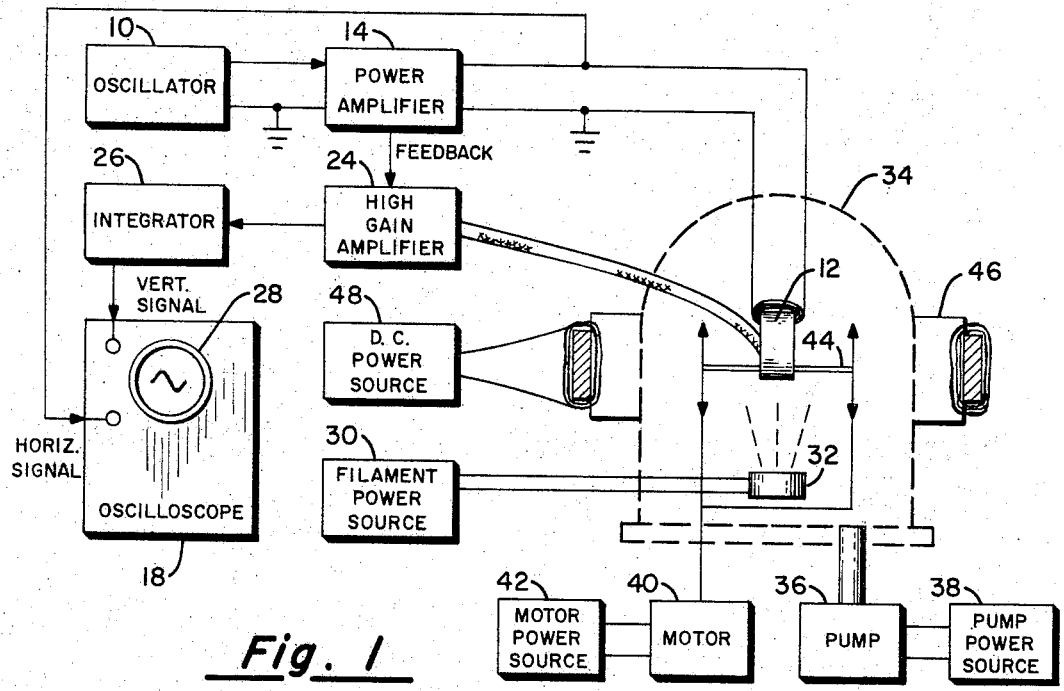
FIG. 1 is a block diagram of the setup utilized to practice the present invention.

The energy E per unit volume and the torque T per unit volume for a uniaxial thin ferromagnetic film subjected to uniaxial stress are given by the equations:

$$E = K_1 \sin^2 \theta + K_2 \sin^2 (\phi - \theta) - MH \cos (\psi - \theta) \quad (11)$$
$$T = -K_1 \sin 2\theta + K_2 \sin 2(\phi - \theta) + MH \sin (\psi - \theta) \quad (12)$$

where:

$K_1$ = the M-induced anisotropy constant attained by anneal in a magnetic field;

$$K_1 = \tfrac{1}{2} M_s H_k$$

where $M_s$ = the saturation magnetization; and
$H_k$ = the anisotropy field, i.e., the field which when applied in the difficult direction will rotate the magnetization of the film from the easy to the difficult direction;
$K_2$ = the strain-induced anisotropy energy per unit volume;

$$K_2 = \tfrac{3}{2} \lambda_s \sigma$$

where $\lambda_s$ = the saturation magnetostriction; and
$\sigma$ = the uniaxial stress;
$\theta$ = the angle between the magnetization M and the easy axis of the unstressed film;
$\phi$ = the angle between the strain axis and the easy axis; and
$\psi$ = the angle between the applied magnetic field and the easy axis.

The relationship between the rotation of the magnetization M through the angle $\theta$ due to an applied stress (and resulting strain) and the normalized strain anisotropy $K_2/K_1 = k$, in the absence of an applied field is:

$$\tan 2\theta = \frac{k \sin 2\phi}{1 + k \cos 2\phi} \quad (13)$$

or $$k = \frac{\sin 2\phi}{\sin 2(\phi - \theta)} \quad (14)$$

In the presence of stress the magnetization M is rotated and also an effective anisotropy field $H_k'$ is attained which is related to $H_k$ and $k$ by Equation 15.

$$\frac{H_k'}{H_k} = (1 + k^2 + 2K \cos 2\phi)^{1/2} \quad (15)$$

Substitution of Equation 14 into Equation 15 yields Equation 16 which relates the normalized effective anisotropy field $H_k'/H_k$ to the magnetization M rotation and applied stress direction.

$$\frac{H_k'}{H_k} = \frac{\sin 2\phi}{\sin 2(\phi - \theta)} \quad (16)$$

The rotation of the magnetization M and/or the change in the anisotropy field with strain is employed to detect the property of magnetostriction. Switching the film element with an applied magnetic field while the film is being periodically stressed allows a sensitive observation of magnetostrictive effects.

GENERAL METHODS

Three methods of monitoring the magnetostriction of thin ferromagnetic films by periodically stressing the films during their generation by vacuum deposition are illustrated. In two of the methods, indicated schematically by FIGS. 9a and 7a, the strain axis S is rotated approximately 90° from the direction of the drive field $H_{AC}$; sensing in the longitudinal direction with respect to $H_{AC}$ in FIG. 9a, and sensing in the transverse direction with respect to $H_{AC}$ in FIG. 7a. The third method indicated schematically by FIG. 8a employs transverse sensing, with the angle between the drive field $H_{AC}$ and the strain axis S being fixed at some angle between 0° and 90°, where 45° is the preferred operating angle. In each case the substrate upon which the test-film is deposited is strained at a low repetition rate. A localized alternating magnetic film $H_{AC}$ employed as an orienting field during film deposition also switches the magnetization of the test-film being deposited. The phase (with respect to $H_{AC}$) and amplitude fluctuations of the film-switching signal due to the induced strains are a function of the magnetostriction.

The longitudinal pickup mode of operation (FIG. 9a) is employed to detect the wall-motion switching of the test-film. The test-film is strained in such a manner that rotation of the magnetization M away from the original easy axis of the unstrained test-film does not occur. Since the strain axis S makes an angle of 90° with the easy axis of the unstrained test-film a compressive stress applied to a test-film with positive magnetostriction, or a tensile stress applied to a test-film with negative magnetostriction, will not rotate the direction of magnetization. The induced strain energy density, while not affecting the direction of magnetization, does increase the effective anisotropy field $H_k'$ according to Equation 15. Since the coercive force $H_c$ changes directly with a change of the anisotropy field, the field necessary to cause switching by wall-motion increases with an increase of the applied stress and resulting strain. However, if the test-film is nonmagnetostrictive, the observed $H_c$ remains constant regardless of the state of strain.

Figure 7B:
Figure 7A:
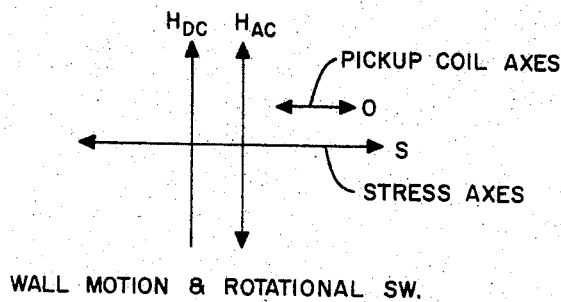
FIG. 7a is an illustration of the relationships of the drive fields, strain axis and sense axis of a first method of practicing the present invention.

In FIG. 7a the strain axis S makes an angle of approximately 90° with the easy axis of the unstrained test-film, and both tensile and compressive stresses are applied alternately to the depositing test-film regardless of the sign of the magnetostriction. As an example, consider a film with positive magnetostriction and its magnetic behavior under the influence of applied stresses. Under compression the magnetization does not rotate noticeably but the effective anisotropy field $H_k'$ increases. Under tension the magnetization will rotate significantly toward the strain axis according to Equations 13 or 14, and $H_k'$ changes according to Equations 15 or 16. The rotation of the magnetization M and the change in $H_k'$ alters the output signal with applied field, $H_{AC}$. This signal modulation with stress is due to a nonzero value of magnetostriction of the depositing test-film. With this mode of operation a significant amount of rotational switching occurs. For a nonmagnetostrictive test-film the size, shape, and separation of the switch voltage waveforms vs. applied field will not change because of stress.

Figure 8B:
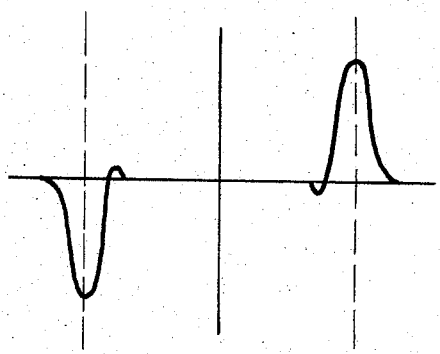
Figure 8A:
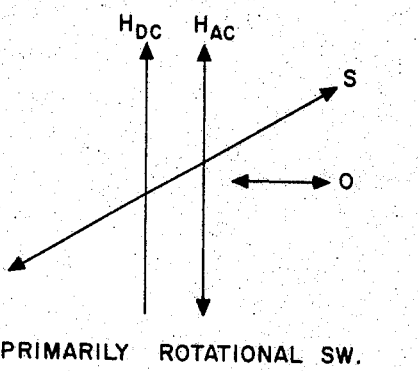
FIG. 8a is an illustration of the relationships of the drive fields, strain axis and sense axis of a second method of practicing the present invention.

In FIG. 8a, equal applied compressive and tensile stresses at 45° rotate the magnetization M equal amounts but on opposite sides of the easy direction of the unstrained test-film in addition to increasing $H_k$. Since the magnetization M direction is rocked about the easy axis, the polarity sequence of the switching output voltage alters with a change from compressive to tensile, and tensile to compressive stress. At an angle other than 45° the polarity reversal still occurs; however, the peak-voltage heights of the signal are unequal for compressive and tensile applied stresses. A nonmagnetostrictive test-film yields a null output upon straining at 45°, because the test-film is being driven along its easy axis.

SYSTEM DESCRIPTION

Figure 4:
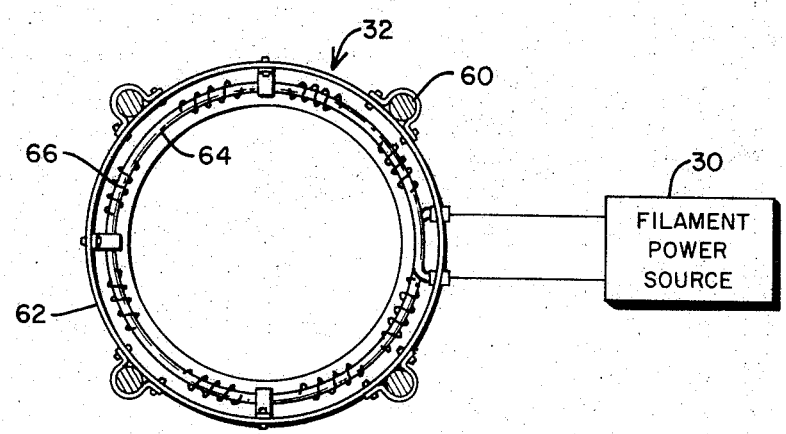
FIG. 4 is a schematic illustration of a wire-ring source of FIG. 2.

With particular reference to FIG. 1 there is illustrated a block diagram of the setup utilized to practice the present invention. An oscillator 10, operating at approximately 1000 c.p.s., supplies the drive current for an AC electromagnet 12 by way of power amplifier 14. The horizontal drive signal is supplied to oscilloscope 18 from power amplifier 14 (by sampling the voltage drop across a resistor in series with electromagnet 12 drive windings). The output signal induced in pickup coil 22 due to the switching of test-film 20 (see FIG. 3) is coupled to a high gain amplifier 24 where a small feedback signal from power amplifier 14 may be utilized to cancel that portion of the output signal due to a misalignment of the drive field and the pickup coil 22. The output signal is coupled from amplifier 24 to provide the vertical drive signal to oscilloscope 18 by way of integrator 26 causing the output signal waveform to be displayed on oscilloscope face 28. Integrator 26 may be utilized to provide the hysteresis loop characteristic of test-film 20 but is normally switched out of the circuit. Control of the constituent material of test-film 20 is achieved by control of current from filament power source 30 to wire ring source 32 (FIG. 4).

The evacuatable environment for the generation of test-film 20 is achieved by bell jar 34 which forms a sealed enclosure whose internal pressure is controlled by pump 36 and pump power source 38. Strain is induced in test-film 20 by way of motor 40 and motor power source 42 which impart, through appropriate mechanical means, tensile or compressive stresses to substrate 44. A DC orienting field for the purpose of generating the property of uniaxial anisotropy in the production films may be provided by DC electromagnet 46 and DC power source 48.

STRUCTURE DESCRIPTION

Figure 2:
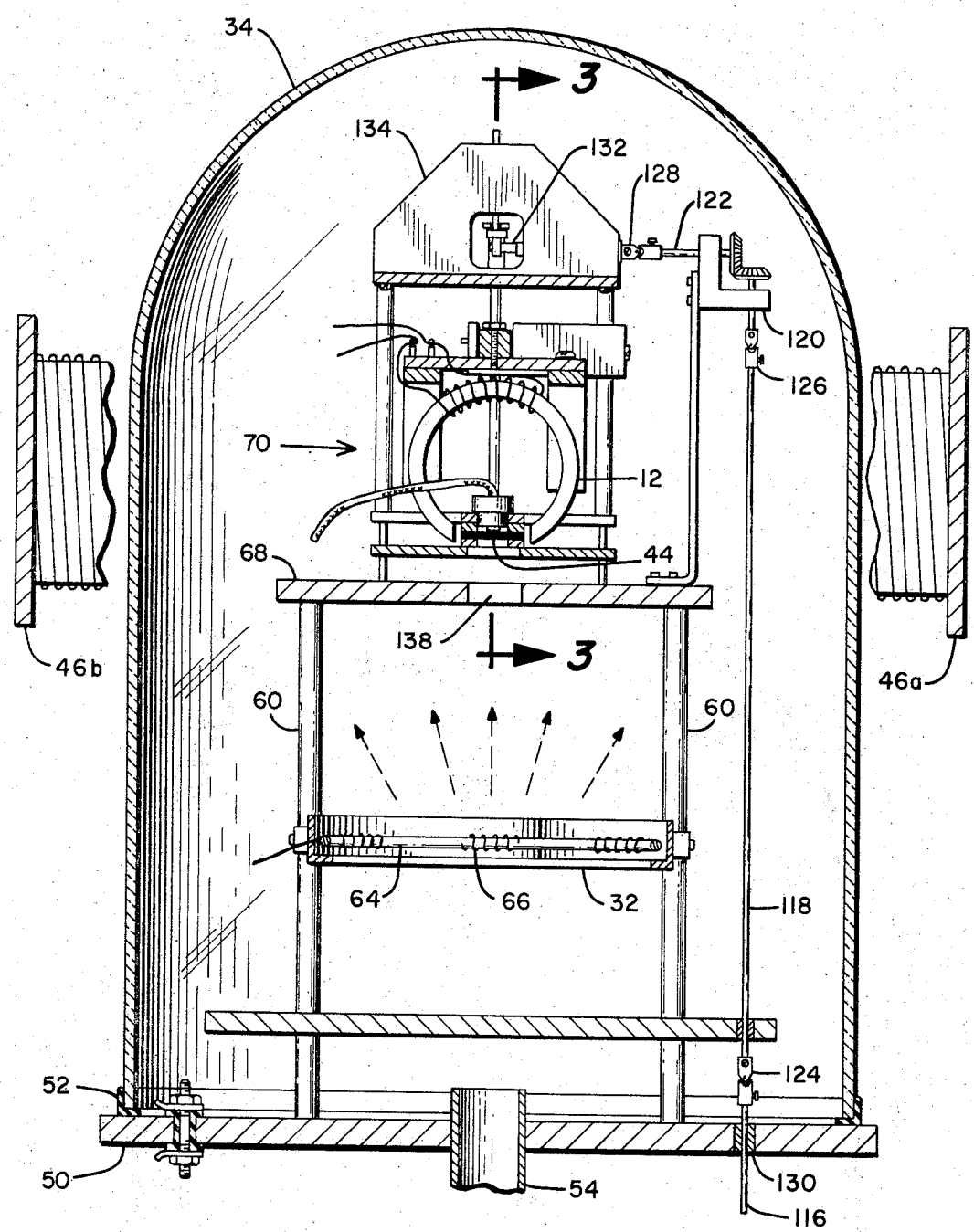
FIG. 2 is a schematic illustration of the evacuatable environment in which the memory elements of the present invention are to be generated.

With particular reference to FIG. 2 there is illustrated a preferred embodiment of the present invention. In this embodiment generation of the film elements is accomplished in an evacuatable environment. Such apparatus may comprise a bell jar 34 mounted on a supporting base 50 sealed at rim 52 between the jar 34 and the base 50. A vacuum pressure of approximately $10^{-5}$ torr or less is maintained in jar 34 by connecting its interior to vacuum pump 36 by way of conduit 54 through base 50. External to jar 34 there is mounted on base 50 a DC electromagnet 46 providing a magnetic field between opposing plates 46a and 46b. Electromagnet 46 is utilized to provide the DC orienting magnetic field during deposition of the memory element so as to provide the magnetic characteristic of uniaxial anisotropy in the deposited elements if such characteristic is desired. This characteristic gives rise to a single preferred, or easy, axis of remanent magnetization in the plane of the film and a different axis of magnetization at right angles thereto.

In the preferred embodiment the generated elements are formed of a nonmagnetostrictive nickel-iron alloy material having two stable remanent magnetic states and reasonable drive field requirements. The aforementioned Rubens Patent No. 2,900,282 discloses one method of generating such memory elements utilizing a crucible melt source wherein there are produced memory elements having the property of uniaxial anisotropy, exhibiting substantially no magnetostriction and exhibiting single domain properties. Such films are of approximately 81.5% Ni–18.5% Fe and of approximately 100 A. to 3000 A. thickness and are referred to as "thin films." Thin films when subjected to an external magnetic field parallel to the plane of the film exhibit the magnetic characteristic of having single domain properties. In a film having such properties the magnetization may be represented by a vector quantity M having both amplitude and direction, the remanent direction being in alignment with the easy axis generated by the orienting DC field—such as that generated by electromagnet 46.

Single domain properties may be considered the characteristic of a three-dimensional element of magnetizable material having a thin dimension that is substantially less than the width and length thereof wherein no domain walls can exist parallel to the large surface of the element. Further, the term "magnetizable material" may be considered to refer to a material having the characteristic of magnetic remanence, the term being sufficiently broad to encompass ferrimagnetic or ferromagnetic material. Memory elements as generated by the apparatus of the preferred embodiment of FIG. 2 may, or may not, have the property of uniaxial anisotropy, i.e., they may be isotropic or even have a plurality of axes, and may or may not have single domain properties. Further, as is well-known, the magnetization M of thin films with single domain properties when subjected to an external magnetic field parallel to the plane of the film may rotate in a coherent manner, i.e., the rotation of the magnetization M takes place uniformly and simultaneously throughout the film, or in a noncoherent manner, i.e., the rotation of the magnetization M takes place nonuniformly and nonsimultaneously throughout the film in that the magnetization separates into distince magnetic homogeneous regions that individually rotate independently of each other. Consequently, although the preferred embodiment shall be discussed as generating a thin ferromagnetic film memory element having the property of uniaxial anisotropy and single domain properties, no limitation thereto is intended.

Internal to bell jar 34 and mounted on plate 50 there is shown a supporting means 60 which provides the mechanical means for orienting the material source which includes ring-wire source 32 supported by shroud 62. This embodiment utilizes a ring-wire source 32 which consists of a tungsten wire core 64 about which a fine wire 66 of a nickel-iron alloy is wound in a helical manner. See the copending patent application of Hanson et al., Ser. No. 154,527, now Patent No. 3,192,931, filed Nov. 24, 1961, and assigned to the assignee of the present invention for one such wire-ring source arrangement. Electrical power from source 30 is coupled to the opposite ends of the ring-wire core in much the same manner as with a conventional high resistance electrical heating element. The heated core 64 vaporizes the wire 66 and some of the vapor particles emanating therefrom move in an upward direction into the area of the substrate members.

Although a ring-wire source is utilized in the preferred embodiment, no limitation to a source of such type is intended. An embodiment utilizing an axial-wire source with the substrate members mounted in a radially-cylindrical plane about the axial-wire source will operate in much the same manner. Further, an embodiment utilizing crucible melts such as Ni-Fe will operate in much the same manner as that of the aforementioned Rubens Patent No. 2,900,-282, with control of the deposited-layer element's magnetostriction characteristics achieved through control of the electrical power used to melt the charge in the crucible. Further, in an embodiment utilizing the application of wires of material such as Ni-Fe alloy which touch upon a heated tungsten post causing such wires to vaporize thereby, magnetostriction could be controlled by the rate of application of such wires to the posts. Additionally, in the production of deposited-layer elements by electroplating, the material's magnetostriction characteristics could be controlled by the variation of the several parameters including composition of the solution, current density, solution temperature or solution pH while in the generation by chemical deposition control of the material's magnetostriction characteristics could be controlled by the variation of several parameters including solution temperature, solution composition or solution pH.

Above supporting means 60 and mounted thereon there is shown plate 68 upon which test apparatus 70, which in turn supports test substrate means 44, and substrate means 72 are mounted (see FIG. 3). Substrate means 72 is the means upon which the production run elements 74 are generated and as such its function and construction is well-known in the art and plays no part in the present invention except that it is the product whose magnetic characteristics are indirectly determined by the monitoring of the magnetic characteristics of test-film 20 by the operation of the present invention. Although no limitation thereto is intended, substrate means 72 may be of a high-quality glass substrate mounted immediately above mask 76 which is in turn oriented above aperture 78 in plate 68. Heating element 80 provides the necessary source to pre-heat substrate means 72 to the required temperature prior to initiation of the element generation process.

Test apparatus 70 provides the necessary mechanical support for test substrate means 44 and the actuating means whereby test substrate 44 may be subjected to compressive or tensile stresses during the element generation process. Test substrate means 44 is held between two opposing convex-faced clamping means 90 and 92 which restrain test substrate means 44 in a vertical direction. Bottom clamping means 90 has an aperture 94 therethrough through which the vaporized material is permitted to pass to become deposited upon the exposed portion of the bottom of test substrate means 44 forming test-film 20 while top clamping means 92 has an aperture 96 therethrough into which a pickup coil 22 is inserted. Pickup coil 22, which detects the rate of change in magnetization of test-film 20 during switching is supported by pickup coil support means 98 so as to be securely located in aperture 96 with respect to test-film 20.

Above and about test-film 20 there is suspended electromagnet 12 which generates the magnetic field which provides a 1000-c.p.s. (cycle per second) AC field parallel and anti-parallel to the DC orienting field generated by electromagnet 46. This AC field switches the magnetization M of test-film 20 alternately additive to and subtractive from the DC orienting field thereby causing the test-film 20 to generate a switching field which is detected by pickup coil 22. This switching field generates a signal within pickup coil 22 which signal is indicative of the varying magnetic characteristics of test-film 20. As stated hereinbefore, one purpose of the invention is to achieve magnetizable film elements having a zero magnetostriction characteristic and such characteristic is determinable by the observation of the waveform, or trace, of the output signal detected by such pickup coil 22, which procedure shall be discussed in more detail below.

The opposing ends of test substrate means 44 are held in clamping means 100a and 100b which are rigidly connected to rocker arm pads 102a and 102b, respectively, by means of push rods 104a and 104b, respectively. Rocker arms 106a and 106b follow the vertical, oscillatory action of cam follower 108 which follows the lifting action of cam 110. Lift springs 112a and 112b load push rods 104a and 104b, respectively in a securely biased relationship with respect to rocker arms 106a and 106b, respectively, causing a cyclically smooth operation of the push rods throughout each rotation of cam 110. The entire assembly of cam 110, cam follower 108, cam follower pads 102, push rods 104, clamping means 100 and test substrate means 44 is preferably adjusted to place test substrate means 44 in an essentially planar, nonstress-induced condition when cam 110 has placed cam follower 108 at the median point of its vertical travel. In this manner the compressive and tensile stresses placed on test-film 20, due to the flexing of test substrate means 44 about clamping means 90 and 92 by the vertical movement of push rods 104, are most nearly equal in magnitude.

Cam 110 is rotated at a frequency of approximately 2 c.p.s. by motor 40. The driving power of motor 40 is connected to cam 110 by means of drive shafts 116 and 118, gear means 120 and drive shaft 122. Suitable universal joints 124, 126 and 128 provide the necessary noncolinear coupling between portions of drive shafts 116 and 118, gear means 120 and the bushings 130 and 132 provided by plate 50 and bracket 134, respectively.

OPERATION

Deposition of test-film 20 upon test substrate 44 and of production run elements 74 upon substrate 72 is initiated by installing test substrate 44 in test apparatus 70 and by loading substrate 72 into its proper position above mask 76. This preparatory work includes the proper orienting of test substrate 44 between clamping means 90 and 92 with particular respect to the respective apertures 94 and 96 therethrough, and the adjusting of clamping means 100a and 100b about the ends of test substrate 44 so as to obtain a secure holding thereof while achieving a substantially planar, non-stressed condition of test substrate 44 when the periphery of cam 110 causes cam follower 108 to be at the midpoint of its vertical travel.

The following steps, not necessarily in the order given, are then performed preparatory to generating the test-film 20 upon test substrate 44 and elements 74 upon substrate 72:

(1) Bell jar 34 is lowered into place upon plate 50 forming an evacuatable environment for the generation of test-film 20 upon test substrate 44 and elements 74 upon substrate 72.

(2) Electrical power from source 38 is coupled to pump means 36 so as to provide the desired operating pressure within bell jar 34.

(3) Electrical power from an appropriate source is coupled to heater element 80 so as to pre-heat substrate 72 to the desired temperature prior to forming elements 74 thereon.

(4) Electrical power from source 48 is applied to electromagnet 46 so as to generate the DC orienting field necessary to provide the desired magnetic characteristic of uniaxial anisotropy in elements 74 upon substrate 72.

(5) Electrical power from source 14 and oscillator 10 is applied to electromagnet 12 so as to generate the AC drive field necessary to switch the magnetization M of the to-be-generated test-film 20 thereby generating a switching field which is to be detected by pickup coil 22.

(6) Electrical power from source 42 is coupled to motor 40 causing alternate cycles of tensile and compressive strains to be induced in the to-be-generated test-film 20.

After completion of the preparatory steps 1–6 above, actual generation and monitoring of the varying magnetostrictive characteristics of test-film 20 and elements 74 may then be initiated. The following steps, not necessarily in the order given, are then performed to generate elements having the desired magnetostrictive characteristics:

(1) Electrical power from source 30 is coupled to wire-ring source 32 which power heats the core 64 causing the Permalloy wire 66 wound thereabout to vaporize. The vapor particles emanating from source 32 move into the area of substrates 44 and 72 that are exposed by aperture 138 in plate 68 and the apertures in mask 76, respectively.

(2) Pickup coil 2 detects the switching field generated by the switching of the magnetization M of test-film 20 as caused by the AC driving field produced by electromagnet 12. The detected switching field generates an output signal in pickup coil 22. The generated output signal is coupled to monitor oscilloscope 18 by way of amplifier 24 producing an output signal trace on monitor oscilloscope 18.

(3) The output signal trace on monitor oscilloscope 18 is observed and analyzed as to its indication of the magnetostrictive characteristics of test-film 20—and indirectly that of elements 74.

(4) When it is determined that test-film 20 has the desired magnetostrictive characteristic, the generation of test-film 20 and elements 74 is halted.

MATERIAL SOURCES

As discussed hereinbefore, there are several sources of material that may be utilized with the present invention. A few of these are listed below:

(1) Fractionating wire.
  (a) Ring-wire
  (b) Axial-wire
(2) Crucible melt.
(3) Wire feed on refractory post.
(4) Electroplating.
(5) Chemical deposition.
(6) Sputtering.
(7) Thermochemical decomposition.

(1) The fractionating wire source, either of the wire-ring as illustrated in the preferred embodiment of FIG. 1 or the axial-wire variety, is an easily controlled method of providing large production runs of deposited-layer elements of a desired material composition and magnetostrictive characteristics. An alloy placed upon the tungsten wire core of this source will, upon melting, produce a metal vapor whose composition will vary with the time of evaporation. Nonmagnetostrictive elements are produced when the total composition of the constituent metal vapors as condensed upon the substrate have the proper percentage relationships. As an example, an alloy of 83% Ni–17% Fe will, for a given temperature, vaporize out the iron faster than the nickel producing an element that is initially "iron-rich" having, for example, positive magnetostriction. As the evaporation process continues, the iron becomes depleted and soon the emanating nickel vapor predominates causing the element to proceed toward a "nickel-rich" composition and toward a negative magnetostriction. At that instance when the magnetostrictive effect of the nickel (negative) cancels the magnetostrictive effect of the iron (positive) the generation process is halted and a nonmagnetostrictive element is produced.

Figure 5:
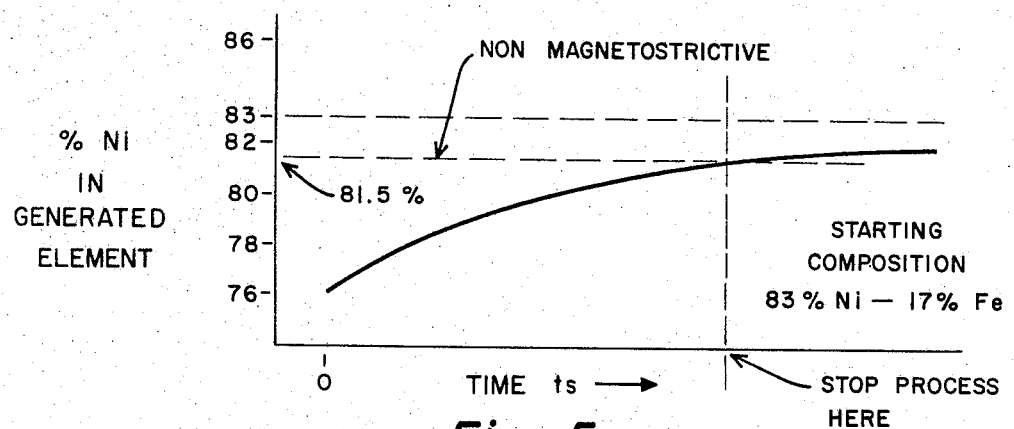
FIG. 5 is a graph of generation time vs. percent Ni in the generated element.

With particular reference to FIG. 5 there is illustrated the relationship of the time of the generation of the element vs. the percentage of the nickel in the generated element. By selecting the proper starting composition and by controlling the electrical power applied to the tungsten wire core there will be produced an element having the desired thickness and material composition, which in the case of Permalloy material is approximately 81.5 Ni–18.5% Fe.

(2) The crucible melt source is less easily controlled due to the time-temperature lag of the crucible melt. However, the same principles apply here as in (1) above.

(3) The wire feed on a tungsten post source is more flexible than either (1) or (2) above. In this arrangement a Ni–Fe wire is fed at a variable rate on a heated tungsten post. The wire is substantially instantaneously vaporized thereby producing a vapor of substantially the same material composition as that desired in the generated element—e.g., 81.5% Ni–18.5% Fe. Alternatively, one can utilize a main wire of a small magnetostrictive characteristic of the negative sense—say 82% Ni–18% Fe—and compensate for the "nickel-rich" main-wire-produced-vapor by utilizing a secondary wire of a small magnetostrictive characteristic of the opposite sense—e.g., positive magnetostriction. The main wire could then provide a continuously produced vapor with the feed of the secondary wire varying the material composition of the generated element to that producing zero magnetostriction. This method provides a more uniform material composition throughout the element thickness and consequently provides a simple method for producing an element of various thicknesses with all thicknesses having a zero magnetostrictive characteristic.

(4) The electroplating method is one capable of providing large production runs of deposited-layer elements of a desired material composition and magnetostrictive characteristics. As discussed hereinbefore, such factors are determined by many parameters including solution composition, current density, solution temperature, time of deposition and solution pH.

(5) The chemical deposition method is more difficult to control than (4) above, but the desired material composition and magnetostrictive characteristics are determinable by many parameters including solution composition, solution temperature, time of deposition, and solution pH.

(6) The sputtering method is one capable of providing large production runs of deposited-layer elements of a desired material composition and magnetostrictive characteristic. In this method an electrical discharge is passed between a plurality of electrodes in an environment of a low gas pressure causing the cathode to be slowly disintegrated under the bombardment of the ionized gas molecules. The disintegrated material leaves the cathode surface either as free atoms or in chemical combination with the residual gas molecules. Some of the liberated atoms are condensed on surfaces, such as the test and production run substrate members, while the remainder are returned to the cathode by collision with gas molecules. In this method various parameters such as current density, electrode potential, gas pressure and cathode-substrate distance may be controlled to provide elements having the desired characteristics.

(7) The thermochemical decomposition of metal-content organic compounds such as the acetyl acetonates of nickel and iron is capable of providing large production runs of deposited-layer elements of a desired material composition and magnetostrictive characteristic. In this method various parameters such as operating temperature, decomposition temperature, gas flow rate, time of decomposition, carrier-gas velocity, substrate temperature and presence or absence of a magnetic field on the substrate during deposition may be controlled to provide elements having the desired characteristics.

STRESS-DRIVE FIELD-SENSE AXES RELATIONSHIPS

As discussed hereinbefore, the present invention provides a method and an apparatus for the monitoring of the varying magnetostrictive characteristics of a test-film during its generation process. This apparatus includes a means of applying to a test-film during its generation process: alternate cycles of compressive and tensile stresses; an AC drive field $H_{AC}$ to cause the test-film's magnetization M to switch therewith, and a pickup coil to intercept the switching field generated by the switching of the test-film's magnetization M. The DC orienting field $H_{DC}$ which is utilized to provide the characteristic of uniaxial anisotropy in the production run elements is not essential to the operation of the present invention; the AC drive field $H_{AC}$ provides the orienting field for the test-film during its generation. Each of these above items—the applied stress, the AC drive field $H_{AC}$ and the pickup coil—may have any one of a plurality of axis orientation relationships and yet provide an output signal which may be analyzed as to the varying magnetostrictive characteristics of the test-film. As a further example, the stress applied to test substrate means 44 may be a torsional, rather than a bending stress with suitable modification of the pickup coil 22 orientation. Discussion herein is to be limited to three such arrangements with no limitation thereto intended. These three arrangements utilize: a DC orienting field, $H_{DC}$, axis; an AC drive field, $H_{AC}$, axis; an applied stress axis, S; and a sense, or output, axis, O which is the magnetic axis of the pickup coil 22. For purposes of describing the following arrangements the basic orienting axis shall be the stress axis, S, which for purposes of this application shall be defined as a line drawn through the plane of test-film 20 and the two clamps 100a and 100b.

As discussed hereinbefore, the discussion of the preferred method and apparatus of the present invention shall be directed toward the generation of thin ferromagnetic films having the property of uniaxial anisotropy providing an easy, or preferred axis along which the film's magnetization M shall lie in a remanent state and having single domain properties. As such films may be induced to switch in the rotational or by wall-motion switching mode, i.e., walls perpendicular to the large surface of the film, the three following discussions are concerned with three stress drive field sense axis relationships that produce:

(1) Combination rotational and wall-motion switching,
(2) Rotational switching, and
(3) Wall-motion switching of the test-film.

ANALYSIS OF TEST-FILM MAGNETOSTRICTION CHARACTERISTICS

As discued hereinbefore, several stress-drive field-sense axes relationships may be utilized. In the preferred embodiment of applicants' invention as disclosed in FIG. 2 there is disclosed a first such relationship. However, such relationship is not intended to be a limitation thereto. As the practice of applicants' invention requires the interpretation of an output signal waveform trace as an indication of the magnetostrictive characteristics of the test-film and as such output signal waveform trace is a function of the stress-drive field-sense axis relationship, three such preferred relationships and their associated output signal waveform traces and the interpretation of such traces as to the magnetostrictive characteristics of the test-film shall be discussed below.

(1) In a first embodiment the stress-drive field-sense axes relationships produce a combination of rotational and wall-motion switching of the test-film and is as illustrated in FIG. 7a. In this arrangement the $H_{DC}$ and $H_{AC}$ axes are parallel, in the plane of the test-film 20 and perpendicular to the S axis, while the O axis is superposed above the plane of the test-film 20 and parallel to the S axis. The AC drive field provides a magnetomotive force tending to cause the test-film's magnetization M to switch into alignment therewith. The switching of the test-film's magnetization M in turn generates a switching field which is coupled to the pickup coil, oriented at a sense axis O, which induces therein an output signal which is indicative of the magnetostrictive characteristics of the test-film. As the test-film progresses through its stress cycle (compressive-tensile) any motion of the trace of the output signal waveform—as for instance displayed upon a monitor oscilloscope face 28—indicates that the test-film is magnetostrictive; the size, shape or separation of the output signal trace will vary with the applied stress. Correlatively, when the output signal trace does not vary during the test-film's stress cycle, the test-film is nonmagnetostrictive.

Figure 7C:
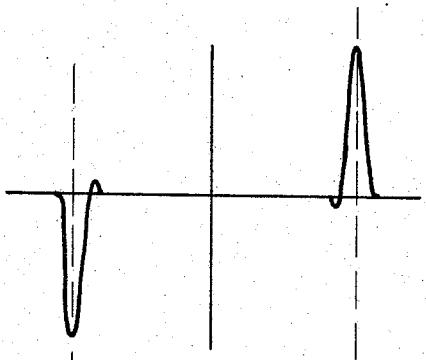
Figure 7D:
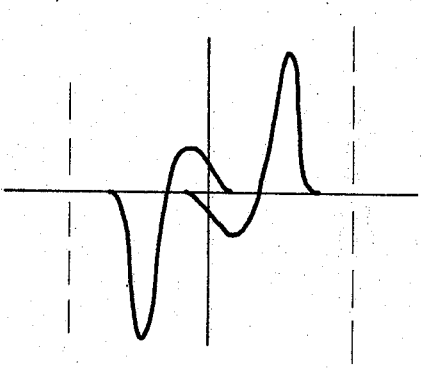

With particular reference to FIGS. 7b, 7c and 7d, there are illustrated the output signal traces obtained with the above described arrangement of FIG. 7a. As the generation process is initiated the initial output signal trace is of negligible amplitude due to the negligible switching field produced by the negligible thickness of the test-film. However, as the generation process continues the output signal trace amplitude increases providing a signal of sufficient amplitude to properly analyze the test-film's varying magnetostrictive characteristic. Initially, for the reasons as discussed hereinbefore, the test-film is iron-rich and produces the following output traces:

(a) Under compressive stress the trace of FIG. 7b,
(b) Under zero stress the trace of FIG. 7c, and
(c) Under tensile stress the trace of FIG. 7d.

As the generation process continues, the metal vapor emanating from source 32, which vapor is initially substantially iron-rich, i.e., having a positive magnetostrictive characteristic, becomes less iron-rich with increase of test-film generation time and if the generation process is not halted will become nickel-rich, i.e., having a negative magnetostrictive characteristic.

With particular reference to FIG. 5 there is disclosed a graph of percent of nickel vs. generation time for a test-film generated by the apparatus of FIG. 2. Starting with a Permalloy wire of 83% Ni–17% Fe it can be seen that the percentage of Ni in the test-film increases with generation time, approaching, as a limit, the percentage of Ni in the Permalloy wire of 83% Ni. As it has been determined empirically that the nonmagnetostrictive test-film material composition is approximately 81.5% Ni–18.5% Fe the desired time of generation is determined by the intersection of the 81.5% Ni line with such graph. However, as such a graph is variable over a plurality of production runs due to uncontrollable variations in the generating apparatus parameters, such a direct analysis, i.e., by control of generation time only, does not produce consistent production runs of magnetizable memory elements of substantially zero magnetostriction.

By the monitoring of the output signal trace as displayed on a monitor oscilloscope during the initial stages of the generation process the successive traces of FIGS. 7b–7c—7d–7c, etc., are observed. As the generation process continues the signal amplitude tends to level off with the trace more closely resembling that of FIG. 7c with variations of the signal trace of FIG. 7c to FIG. 7d and from FIG. 7c to FIG. 7b decreasing. When such variation is observed to become zero, i.e., a trace similar to FIG. 7c is consistently displayed, the test-film is nonmagnetostrictive and the generation process is halted.

(2) In a second embodiment the stress-drive field-sense axes relationships primarily produce rotational switching of the test-film and is as illustrated in FIG. 8a. In this arrangement the $H_{DC}$ and $H_{AC}$ axes are parallel, in the plane of test-film 20 and at an angle of 45° with respect to the S axis, while the O axis is superposed above the plane of test-film 20 and perpendicular to the $H_{DC}$ and $H_{AC}$ axes.

Figure 6:
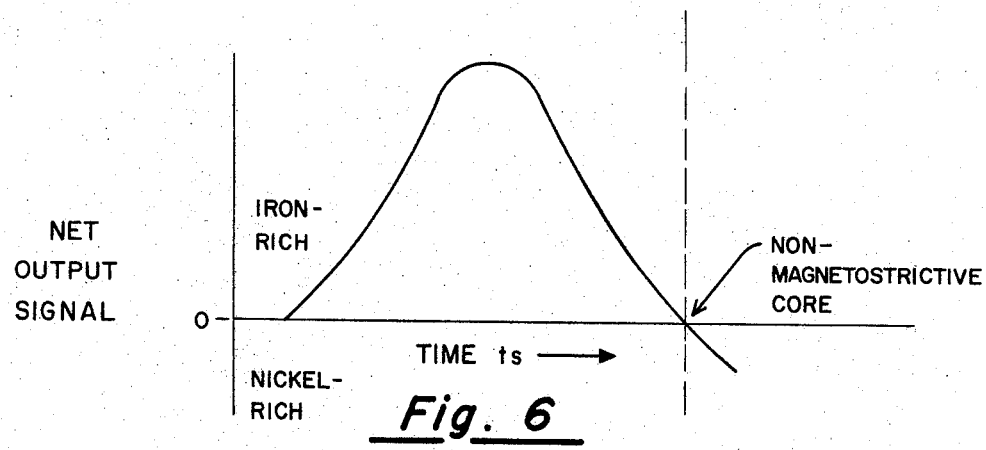
FIG. 6 is a graph of generation time vs. test-core net output signal.

With particular reference to FIG. 6 there is illustrated a graph of output signal amplitude vs. generation time for a test-film generated by the apparatus of FIG. 2 utilizing this stress-drive field-sense axes relationship. Starting with a Permalloy wire of 83% Ni–17% Fe it can be seen that, as with FIG. 5, the test-film is initially iron-rich, i.e., having a positive magnetostrictive characteristic, and that the percentage of Ni in the test-film increases wih generation time approaching the percentage of Ni in he Permalloy wire. As the Fe in the metal vapor becomes depleted, the percentage of Fe decreases and the percentage of Ni increases, i.e., having a decreasingly positive magnetostrictive characteristic. When the output signal becomes substantially zero the generation process is halted for it is at this time that the test-film, and correspondingly, the production run memory elements, are substantially nonmagnetostrictive.

Figure 8C:
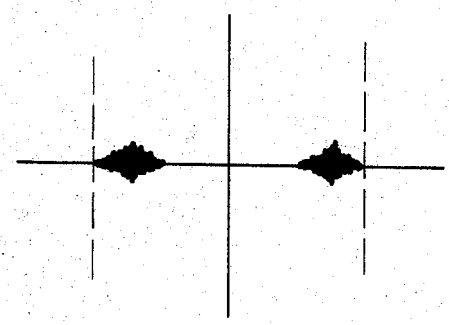
Figure 8D:
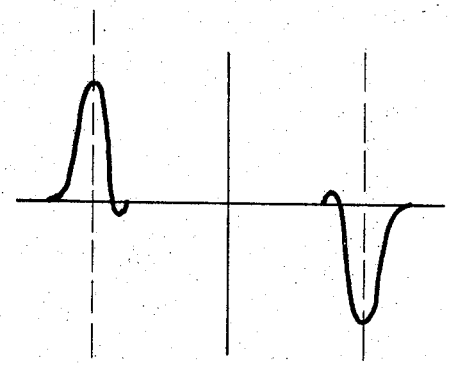

By the monitoring of the output signal trace as displayed on a monitor oscilloscope during the initial stages of the generation process the polarity reversing, successive traces of FIGS. 8b, 8c, 8d, 8c, etc., are observed. As the generation process continues the signal amplitude reaches a maximum and then begins to decrease as illustrated in FIG. 6. When the observed trace ceases to reverse polarity and approaches a minimum as at FIG. 8c, the test-film is nonmagnetostrictive and the generation process is halted.

Figure 9A:
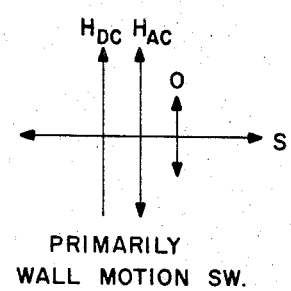
FIG. 9a is an illustration of the relationships of the drive fields strain axis and sense axis of a third method of practicing the present invention.

(3) In a third embodiment the stress-drive field-sense axes relationship principally produces wall-motion switching of the test-film and is as illustrated in FIG. 9a. In this arrangement the $H_{DC}$ and $H_{AC}$ axes are parallel, in the plane of test-film 20 and perpendicular to the S axis, while the O axis is superposed above the plan of test-film 20 and parallel to the $H_{DC}$ and $H_{AC}$ axes.

Figure 9B:
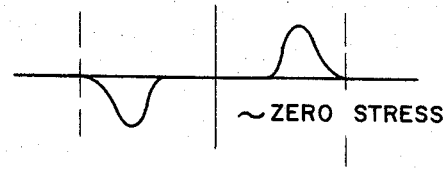
Figure 9C:
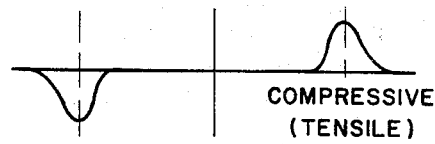

In this arrangement test apparatus 70 is adjusted to subject test substrate 44 to either compressive or tensile stress but not both; when the test-film is initially iron-rich the test-film is subjected to alternate cycles of zero and compressive stresses, while when the test-film is initially nickel-rich and test-film is subjected to alternate cycles of zero and tensile stresses. With particular reference to FIGS. 9b and 9c there are illustrated traces of the output signals induced in pickup coil 22 along the O axis when test substrate 44 is subjected to alternate cycles of zero stress, as at FIG. 9b, and compressive stress, as at FIG. 9c. Starting with a Permalloy wire of 83% Ni–17% Fe, as with FIG. 5 the test-film is initially iron-rich, i.e., having a positive magnetostrictive characteristic, and the percentage of Ni in the test-film increases with generation time approaching the percentage of Ni in the Parmalloy wire. As the Fe in the metal vapor becomes depleted, the percentage of Fe decreases and the percentage of Ni increases, i.e., having a decreasingly positive magnetostrictive characteristic. By the monitoring of the output signal trace as displayed on the monitor oscilloscope, successive traces of FIGS. 9b, 9c, 9d, 9e, etc., are observed. As the generation process continues the signal amplitude increases. When the monitored trace ceases to vary during the test-film's stress cycle the test-film is nonmagnetostrictive and the generation process is halted.

It is understood that suitable modifications may be made in the structure and method as disclosed provided such modifications come within the spirit and scope of the appended claims. Having now, therefore, fully illustrated and described our invention, what we claim to be new and desire to protect by Letters Patent is:

1. A method of generating a deposited-layer element having a desired magnetostriction, comprising the steps of:
   placing a test substrate in a deposited-layer magnetostrictive-alloy element generating environment;
   initiating the generation process of said element upon said test substrate;
   applying cyclically varying tensile and compressive stresses to said element during its generation;
   applying an AC drive field to said element;
   detecting the switching field caused by the magnetization of said element as generated by said AC drive field;
   generating from said detected switching field an output signal whose signal trace is a function of said AC drive field and of said alternate cycles of tensile and compressive stresses;
   monitoring said output signal; and,
   controlling said element's generation process by monitoring said output signal waveform during said application of said AC drive field and said cyclically variable tensile and compressive stresses, to achieve a predetermined output signal waveform indicating that said element is in said desired magnetostrictive condition.

2. A method of generating a deposited-layer element having a desired magnetostriction, comprising the steps of:
   placing a test substrate in a deposited-layer magnetostrictive-alloy element generating environment;
   initiating the generation process of said element upon said test substrate;
   applying cycles of varying stresses to said element during its generation;
   applying an AC drive field to said element;
   detecting the switching field caused by the magnetization of said element as generated by said AC drive field;
   generating from said detected switching field an output signal whose signal trace is a function of said AC drive field and of said cycles of varying stresses;
   monitoring said output signal; and,
   halting said element's generation process when said monitored output signal trace ceases to vary during said application of said AC drive field and said cycles of varying stresses, said non-varying trace indicating that said element is in said desired magnetostrictive condition.

3. A method of generating a deposited-layer element having a desired magnetostriction, comprising the steps of:
   placing a test substrate in a deposited-layer magnetostrictive-alloy element generating environment;
   initiating the generation process of said element upon said test substrate;
   applying cyclically varying tensile and compressive stresses to said element during its generation;
   concurrently applying an AC drive field to said element;
   detecting the switching field caused by the magnetization of said element as generated by said AC drive field;
   generating from said detected switching field an output signal whose signal trace is a function of said AC drive field and of said cycles of tensile and compressive stresses;
   monitoring said output signal; and,
   controlling said element's generation process and causing said monitored output signal trace to cease to vary during said concurrent application of said AC drive field and said alternate cycles of tensile and compressive stresses, said non-varying trace indicating that said element is in said desired magnetostrictive condition.

4. A method of generating a deposited-layer element having a desired magnetostriction, comprising the steps of:
   placing a test substrate in a deposited-layer magnetostrictive-alloy element generating environment;
   initiating the generation process of said element upon said test substrate;
   applying cycles of varying stresses to said element during its generation;
   concurrently applying an AC drive field to said element;
   detecting the switching field caused by the magnetization of said element as generated by said AC drive field;
   generating from said detected switching field an output signal whose signal trace is a function of said AC drive field and of said alternate cycles of varying stresses;
   monitoring said output signal; and,
   controlling said element's generation process causing said monitored output signal trace to achieve a minimum amplitude during said concurrent application of said AC drive field and said alternate cycles of varying stresses, said minimum amplitude trace indicating that said element is in said desired magnetostrictive condition.

5. A method of generating a deposited-layer element having a desired magnetostriction, comprising the steps of:
   placing a test substrate and a memory element defining mask in an evacuatable enclosure;
   reducing the atmospheric pressure within said enclosure to a maximum pressure of $10^{-5}$ torr;
   initiating the generation of said element as defined by said mask by the creation of a vapor of magnetizable-alloy material within said enclosure;
   permitting said vapor to generate said element by permitting said vapor to become affixed to said test substrate of a shape as defined by said mask;
   applying alternate cycles of varying stresses to said element along a first axis in the plane of said element;
   applying an AC drive field to said element along a second, and different, axis;
   applying a DC orienting field to said element along said second axis;
   detecting, along a third axis in a plane parallel to the plane of said element, the switching field of said element as generated by the switching of the magnetization of said element due to said AC drive field;

generating an output signal from said detected switching field, said output signal having a varying waveform trace which variation is a function of said applied AC drive field and said alternate cycles of varying stresses;

monitoring said varying traces; and, halting said element's generation when said monitored trace ceases to vary during said application of said AC drive field, said DC orienting field and said alternate cycles of varying stresses, said non-varying trace indicating that said element is in said desired magnetostrictive condition.

6. A method of generating a deposited-layer element having a desired magnetostriction, comprising the steps of:

placing a test substrate and a deposited-layer element defining mask in an evacuatable enclosure;

reducing the atmospheric pressure within said enclosure to a maximum pressure of $10^{-5}$ torr;

initiating the generation of said element as defined by said mask by the creation of a vapor of magnetizable-alloy material within said enclosure;

permitting said vapor to generate said element by permitting said vapor to become affixed to said test substrate of a shape as defined by said mask;

applying alternate cycles of varying tensile and compressive stresses to said element along a first axis in the plane of said element;

applying an AC drive field to said element along a second axis which second axis is in the plane of said element and perpendicular to said first axis;

applying a DC orienting field to said element along said second axis;

detecting, along a third axis parallel to said first axis and in a plane parallel to the plane of said element, the switching field of said element as generated by the switching of the magnetization of said element due to said AC drive field;

generating an output signal from said detected switching field, said output signal having a varying waveform trace which variation is a function of said applied AC drive field and said alternate cycles of varying tensile and compressive stresses;

monitoring said varying trace; and, halting said element's generation when said monitored trace ceases to vary during said application of said AC drive field, said DC orienting field and said alternate cycles of varying tensile and compressive stresses, said non-varying trace indicating that said element is in said desired magnetostrictive condition.

7. A method of generating a deposited-layer element having a desired magnetostriction, comprising the steps of:

placing a test substrate and a deposited-layer element defining mask in an evacuatable enclosure;

reducing the atmospheric pressure within said enclosure to a maximum pressure of $10^{-5}$ torr;

initiating the generation of said element as defined by said mask by the creation of a vapor of magnetizable-alloy material within said enclosure;

permitting said vapor to generate said element by permitting said vapor to become affixed to said test substrate of a shape as defined by said mask;

applying alternate cycles of varying tensile and compressive stresses to said element along a first axis in the plane of said element;

applying an AC drive field to said element along a second axis which second axis is in the plane of said element and at an angle of approximately 45 degrees with respect to said first axis;

applying a DC orienting field to said element along said second axis;

detecting, along a third axis perpendicular to said second axis and in a plane parallel to the plane of said element, the switching field of said element as generated by the switching of the magnetization of said element due to said AC drive field;

generating an output signal from said detected switching field, said output signal having a varying waveform trace which variation is a function of said applied AC drive field and said alternate cycles of varying tensile and compressive stresses;

monitoring said varying trace; and, halting said element's generation when said monitored trace achieves a substantially non-varying, minimum amplitude during said application of said AC drive field, said DC orienting field and said alternate cycles of varying tensile and compressive stresses, said substantially non-varying, minimum amplitude trace indicating that said element is in said desired magnetostrictive condition.

8. A method of generating a deposited-layer element having a desired magnetostriction, comprising the steps of:

placing a test substrate and a deposited-layer element defining mask in an evacuatable enclosure;

reducing the atmospheric pressure within said enclosure to a maximum pressure of $10^{-5}$ torr;

initiating the generation of said element as defined by said mask by the creation of a vapor of magnetizable-alloy material within said enclosure;

permitting said vapor to generate said element by permitting said vapor to become affixed to said test substrate of a shape as defined by said mask;

applying alternate cycles of varying tensile to zero stresses to said element along a first axis in the plane of said element;

applying an AC drive field to said element along a second axis which second axis is in the plane of said element and perpendicular to said first axis;

applying a DC orienting field to said element along said second axis;

detecting, along a third axis parallel to said second axis and in a plane parallel to the plane of said element, the switching field of said element as generated by the switching of the magnetization of said element due to said AC drive field;

generating an output signal from said detected switching field, said output signal having a substantially varying waveform trace which variation is a function of said applied AC drive field and said alternate cycles of varying tensile to zero stresses;

monitoring said varying trace; and, halting said element's generation when said monitored trace ceases to vary substantially during said application of said AC drive field, said DC orienting field and said alternate cycles of varying tensile to zero stresses, said substantially non-varying trace indicating that said element is in said desired magnetostrictive condition.

9. A method of generating a deposited-layer element having substantially zero magnetostriction, comprising the steps of:

placing a test substrate in a deposited-layer magnetostrictive-alloy element generating environment;

initiating the generation process of said element upon said test substrate;

applying alternate cycles of tensile and compressive stresses to said element during its generation;

applying an AC drive field to said element;

detecting the switching field of said element as generated by said AC drive field;

generating from said detected switching field an output signal whose signal trace is a function of said AC drive field and of said alternate cycles of tensile and compressive stresses;

monitoring said output signal; and, halting said element's generation process when said monitored output signal trace, during said application of said AC drive field and said alternate cycles of tensile and compressive stresses, indicates that said element is in a substantially nonmagnetostrictive condition.

10. A method of generating a deposited-layer element having substantially zero magnetostriction, comprising the steps of:
  placing a test substrate in a deposited-layer magnetostrictive-alloy element generating environment;
  initiating the generation process of said element upon said test substrate;
  applying alternate cycles of varying stresses to said element during its generation;
  applying an AC drive field to said element;
  detecting the switching field of said element as generated by said AC drive field;
  generating from said detected switching field an output signal whose signal trace is a function of said AC drive field and of said alternate cycles of varying stresses;
  monitoring said output signal; and,
  halting said element's generation process when said monitored output signal trace ceases to vary during said application of said AC drive field and said alternate cycles of varying stresses, said nonvarying trace indicating that said element is in a substantially nonmagnetostrictive condition.

11. A method of generating a deposited-layer element having substantially zero magnetostriction, comprising the steps of:
  placing a test substrate in a deposited-layer magnetostrictive-alloy element generating environment;
  initiating the generation process of said element upon said test substrate;
  applying alternate cycles of tensile and compressive stresses to said element during its generation;
  concurrently applying an AC drive field to said element;
  detecting the switching field of said element as generated by said AC drive field;
  generating from said detected switching field an output signal whose signal trace is a function of said AC drive field and of said alternate cycles of tensile and compressive stresses;
  monitoring said output signal; and,
  halting said element's generation process when said monitored output signal trace ceases to vary during said concurrent application of said AC drive field and said alternate cycles of tensile and compressive stresses, said non-varying trace indicating that said element is in a substantially nonmagnetostrictive condition.

12. A method of generating a deposited-layer element having substantially zero magnetostriction, comprising the steps of:
  placing a test substrate in a deposited-layer magnetostrictive-alloy element generating environment;
  initiating the generation process of said element upon said test substrate;
  applying alternate cycles of varying stresses to said element during its generation;
  concurrently applying an AC drive field to said element;
  detecting the switching field of said element as generated by said AC drive field;
  generating from said detected switching field an output signal whose signal trace is a function of said AC drive field and of said alternate cycles of varying stresses;
  monitoring said output signal; and,
  halting said element's generation process when said monitored output signal trace achieves a minimum amplitude during said concurrent application of said AC drive field and said alternate cycles of varying stresses, said minimum amplitude trace indicating that said element is in a substantially nonmagnetostrictive condition.

13. A method of generating a deposited-layer element having zero magnetostriction, comprising the steps of:
  placing a test substrate and a deposited-layer element defining mask in an evacuatable enclosure;
  reducing the atmospheric pressure within said enclosure to a maximum pressure of $10^{-5}$ torr;
  initiating the generation of said element as defined by said mask by the creation of a vapor of magnetizable-alloy material within said enclosure;
  permitting said vapor to generate said element by permitting said vapor to become affixed to said test substrate of a shape as defined by said mask;
  applying cycles of varying stresses to said element along a first axis in the place of said element;
  applying an AC drive field to said element along a second, and different, axis;
  applying a DC orienting field to said element along said second axis;
  detecting, along a third axis in a plane parallel to the plane of said element, the switching field of said element as generated by the switching of the magnetization of said element due to said AC drive field;
  generating an output signal from said detected switching field, said output signal having a varying waveform trace which variation is a function of said applied AC drive field and said cycles of varying stresses;
  monitoring said varying traces; and,
  stabilizing said element's generation when said monitored trace ceases to vary during said application of said AC drive field, said DC orienting field and said cycles of varying stresses, said nonvarying trace indicating that said element is in a substantially nonmagnetostrictive condition.

14. A method of generating a deposited-layer, magnetizable memory element having zero magnetostriction, comprising the steps of:
  placing a test substrate and a deposited-layer, memory element defining mask in an evacuatable enclosure;
  reducing the atmospheric pressure within said enclosure to a maximum pressure of $10^{-5}$ torr;
  initiating the generation of said element as defined by said mask by the creation of a vapor of magnetizable-alloy material within said enclosure;
  permitting said vapor to generate said element by permitting said vapor to become affixed to said test substrate of a shape as defined by said mask;
  applying cycles of varying tensile and compressive stresses to said element along a first axis in the plane of said element;
  applying an AC drive field to said element along a second axis which second axis is in the plane of said element and perpendicular to said first axis;
  applying a DC orienting field to said element along said second axis;
  detecting, along a third axis parallel to said first axis and in a plane parallel to the plane of said element, the switching field of said element as generated by the switching of the magnetization of said element due to said AC drive field;
  generating an output signal from said detected switching field, said output signal having a varying waveform trace which variation is a function of said applied AC drive field and said alternate cycles of varying tensile and compressive stresses;
  monitoring said varying trace; and,
  halting said element's generation when said monitored trace ceases to vary during said application of said AC drive field, said DC orienting field and said cycles of varying tensile and compressive stresses, said non-varying trace indicating that said element is in a substantially nonmagnetostrictive condition.

15. A method of generating a deposited-layer, magnetizable memory element having zero magnetostriction, comprising the steps of:
placing a test substrate and a deposited-layer, memory element defining mask in an evacuatable enclosure;
reducing the atmospheric pressure within said enclosure to a maximum pressure of $10^{-5}$ torr;
initiating the generation of said element as defined by said mask by the creation of a vapor of magnetizable-alloy material within said enclosure;
permitting said vapor to generate said element by permitting said vapor to become affixed to said test substrate of a shape as defined by said mask;
applying cycles of varying tensile and compressive stresses to said element along a first axis in the plane of said element;
applying an AC drive field to said element along a second axis which second axis is in the plane of said element and at an angle of approximately 45 degrees with respect to said first axis;
applying a DC orienting field to said element along said second axis;
detecting, along a third axis perpendicular to said second axis and in a plane parallel to the plane of said element, the switching field of said element as generated by the switching of the magnetization of said element due to said AC drive field;
generating an output signal from said detected switching field, said output signal having a varying waveform trace which variation is a function of said applied AC drive field and said cycles of varying tensile and compressive stresses;
monitoring said varying trace; and,
halting said element's generation when said monitored trace achieves a substantially non-varying, minimum amplitude during said application of said AC drive field, said DC orienting field and said alternate cycles of varying tensile and compressive stresses, said substantially non-varying, minimum amplitude trace indicating that said element is in a substantially nonmagnetostrictive condition.

16. A method of generating a deposited-layer magnetizable memory element having zero magnetostriction, comprising the steps of:
placing a test substrate and a deposited-layer, memory element defining mask in an evacuatable enclosure;
reducing the atmospheric pressure within said enclosure to a maximum pressure of $10^{-5}$ torr;
initiating the generation of said element as defined by said mask by the creation of a vapor of magnetizable-alloy material within said enclosure;
permitting said vapor to generate said element by permitting said vapor to become affixed to said test substrate of a shape as defined by said mask;
applying cycles of varying tensile to zero stresses to said element along a first axis in the plane of said element;
applying an AC drive field to said element along a second axis which second axis is in the plane of said element and perpendicular to said first axis;
applying a DC orienting field to said element along said second axis;
detecting, along a third axis parallel to said second axis and in a plane parallel to the plane of said element, the switching field of said element as generated by the switching of the magnetization of said element due to said AC drive field;
generating an output signal from said detected switching field, said output signal having a substantially varying waveform trace which variation is a function of said applied AC drive field and said alternate cycles of varying tensile to zero stresses;
monitoring said varying trace; and,
stabilizing said element's generation process when said monitored trace ceases to vary substantially during said application of said AC drive field, said DC orienting field and said cycles of varying tensile to zero stresses, said substantially non-varying trace indicating that said element is in a substantially nonmagnetostrictive condition.

17. A method of generating a deposited-layer magnetizable memory element having zero magnetostriction, comprising the steps of:
placing a test substrate and a deposited-layer, memory element defining mask in an evacuatable enclosure;
reducing the atmospheric pressure within said enclosure to a maximum pressure of $10^{-5}$ torr;
initiating the generation of said element as defined by said mask by the creation of a vapor of magnetizable-alloy material within said enclosure;
permitting said vapor to generate said element by permitting said vapor to become affixed to said test substrate of a shape as defined by said mask;
applying cycles of varying compressive to zero stresses to said element along a first axis in the plane of said element;
applying an AC drive field to said element along a second axis which second axis is in the plane of said element and perpendicular to said first axis;
applying a DC orienting field to said element along said second axis;
detecting, along a third axis parallel to said second axis and in a plane parallel to the plane of said element, the switching field of said element as generated by the switching of the magnetization of said element due to said AC drive field;
generating an output signal from said detected switching field, said output signal having a substantially varying waveform trace which variation is a function of said applied AC drive field and said cycles of varying compressive to zero stresses;
monitoring said varying trace; and,
halting said element's generation when said monitored trace ceases to vary substantially during said application of said AC drive field, said DC orienting field and said cycles of varying compressive to zero stresses, said substantially non-varying trace indicating that said element is in a substantially nonmagnetostrictive condition.

18. An apparatus for the monitoring of the magnetostrictive characteristics of a deposited-layer element so as to achieve a desired magnetostriction in said element, comprising:
means for generating a deposited-layer element of a magnetorestrictive-alloy;
means for cyclically applying varying stresses to said element;
means for applying an AC drive field to said element;
means for detecting the switching of the magnetization of said element as effected by said AC drive field;
means for generating an output signal whose waveform is a function of said cycles of varying stresses;
means for monitoring said output signal; and,
means for halting said element's generation process when said monitored output signal, during said application of said AC drive field and said cycles of varying stresses, indicates that said element is in said desired magnetostrictive condition.

19. An apparatus for the monitoring of the magnetostrictive characteristics of a deposited-layer element so as to achieve a desired magnetostriction in said element, comprising:
means for generating a deposited-layer element of a magnetostrictive-alloy;

means for cyclically applying varying stresses to said element;

means for applying an AC drive field to said element;

means for detecting the switching of the magnetization of said element as caused by said AC drive field;

means for generating a varying output signal whose signal waveform is a function of said cycles of varying stresses;

means for monitoring said output signal; and, means for controlling said element's generation process such that said monitored output signal waveform ceases to vary during said application of said cycles of varying stresses, said non-varying waveform indicating that said element is in said desired magnetostrictive condition.

20. An apparatus for the monitoring of the magnetostrictive characteristics of a deposited-layer element so as to achieve a desired magnetostriction in said element, comprising:

means for generating a deposited-layer element of a magnetostrictive-alloy;

means for applying alternate cycles of tensile and compressive stresses to said element;

means for applying an AC drive field to said element;

means for detecting the switching of the magnetization of said element as generated by said AC drive field;

means for generating an output signal whose signal trace is a function of said AC drive field and said alternate cycles of tensile and compressive stresses;

means for monitoring said output signals; and means for controlling said element's generation process so that said monitored output signal trace maintains a continuous minimum amplitude during said application of said AC drive field and said alternate cycles of tensile and compressive stresses, said minimum amplitude trace indicating that said element is in said desired magnetostrictive condition.

21. An apparatus for the monitoring of the magnetostrictive characteristics of a deposited-layer element so as to achieve zero magnetostriction in said element, comprising:

means for generating a deposited-layer element of a magnetostrictive-alloy;

means for cyclically applying varying stresses to said element;

means for applying an AC drive field to said element;

means for detecting the switching of the magnetization of said element as generated by said AC drive field;

means for generating an output signal whose signal trace is a function of said AC drive field and said cycles of varying stresses;

means for monitoring said output signal; and, means for halting said element's generation process when said monitored output signal trace, during said application of said AC drive field and said cycles of varying stresses, indicates that said element is in a substantially nonmagnetostrictive condition.

22. An apparatus for the monitoring of the magnetostrictive characteristics of a deposited-layer element so as to achieve zero magnetostriction in said element, comprising:

means for generating a deposited-layer element of a magnetostrictive-alloy;

means for applying cyclically varying stresses to said element;

means for applying an AC drive field to said element;

means for detecting the switching of the magnetization of said element as induced by said AC drive field;

means for generating a varying output signal whose signal trace is a function of said AC drive field and said cycles of varying stresses;

means for monitoring said output signal; and, means for halting said element's generation process when said monitored output signal trace ceases to vary during said application of said AC drive field and said cycles of varying stresses, said non-varying trace indicating that said element is in a substantially non-magnetostrictive condition.

23. An apparatus for the monitoring of the magnetostrictive characteristics of a deposited-layer element so as to achieve zero magnetostriction in said element, comprising:

means for generating a deposited-layer element of a magnetostrictive-alloy;

means for applying alternate cycles of tensile and compressive stresses to said element;

means for applying an AC drive field to said element;

means for detecting the switching field caused by the magnetization of said element as generated by said AC drive field;

means for generating an output signal whose signal trace is a function of said AC drive field and said alternate cycles of tensile and compressive stresses;

means for monitoring said output signal; and, means for controlling said element's generation process so that said monitored output signal trace achieves and maintains a minimum amplitude during said application of said AC drive field and said alternate cycles of tensile and compressive stresses, said minimum amplitude trace indicating that said element is in a substantially nonmagnetostrictive condition.

References Cited

UNITED STATES PATENTS

| | | | |
|---|---|---|---|
| 2,900,282 | 8/1959 | Rubens | 117—107 X |
| 2,999,766 | 9/1961 | Ashworth et al. | 117—241 |
| 3,039,891 | 6/1962 | Mitchell | 117—107 X |
| 3,047,423 | 7/1962 | Eggenberger et al. | 117—107 |
| 3,065,105 | 11/1962 | Pohm | 117—107 X |

ALFRED L. LEAVITT, *Primary Examiner.*

A. GOLIAN, *Assistant Examiner.*